(No Model.) 5 Sheets—Sheet 1.

A. E. ELLINWOOD.
HEMP OR FLAX DECORTICATING MACHINE.

No. 461,260. Patented Oct. 13, 1891.

Attest.
Sidney P. Hollingsworth
F. H. Waters

Inventor.
Augustus E. Ellinwood (No Model.) 5 Sheets—Sheet 3.
A. E. ELLINWOOD.
HEMP OR FLAX DECORTICATING MACHINE.

No. 461,260. Patented Oct. 13, 1891.

(No Model.) 5 Sheets—Sheet 4.

A. E. ELLINWOOD.
HEMP OR FLAX DECORTICATING MACHINE.

No. 461,260. Patented Oct. 13, 1891.

(No Model.) 5 Sheets—Sheet 5.

A. E. ELLINWOOD.
HEMP OR FLAX DECORTICATING MACHINE.

No. 461,260. Patented Oct. 13, 1891.

Attest:
Sidney P. Hollingsworth
F. H. Waters

Inventor,
Augustus E. Ellinwood

UNITED STATES PATENT OFFICE.

AUGUSTUS E. ELLINWOOD, OF AKRON, OHIO.

HEMP OR FLAX DECORTICATING MACHINE.

SPECIFICATION forming part of Letters Patent No. 461,260, dated October 13, 1891.

Application filed December 5, 1890. Serial No. 373,637. (No model.)

*To all whom it may concern:*

Be it known that I, AUGUSTUS E. ELLINWOOD, of Akron, in the county of Summit and State of Ohio, have invented certain new and useful Improvements in Hemp or Flax Decorticating Machines, for preparing and cleaning the stalks of fibrous plants and separating the woody or refuse part of the stalk from the fibrous part that is utilized in commerce, of which the following is a specification.

My invention consists in several devices which form my combined machine, or said devices may be applied separately to other forms of similar machines.

Figure 1:
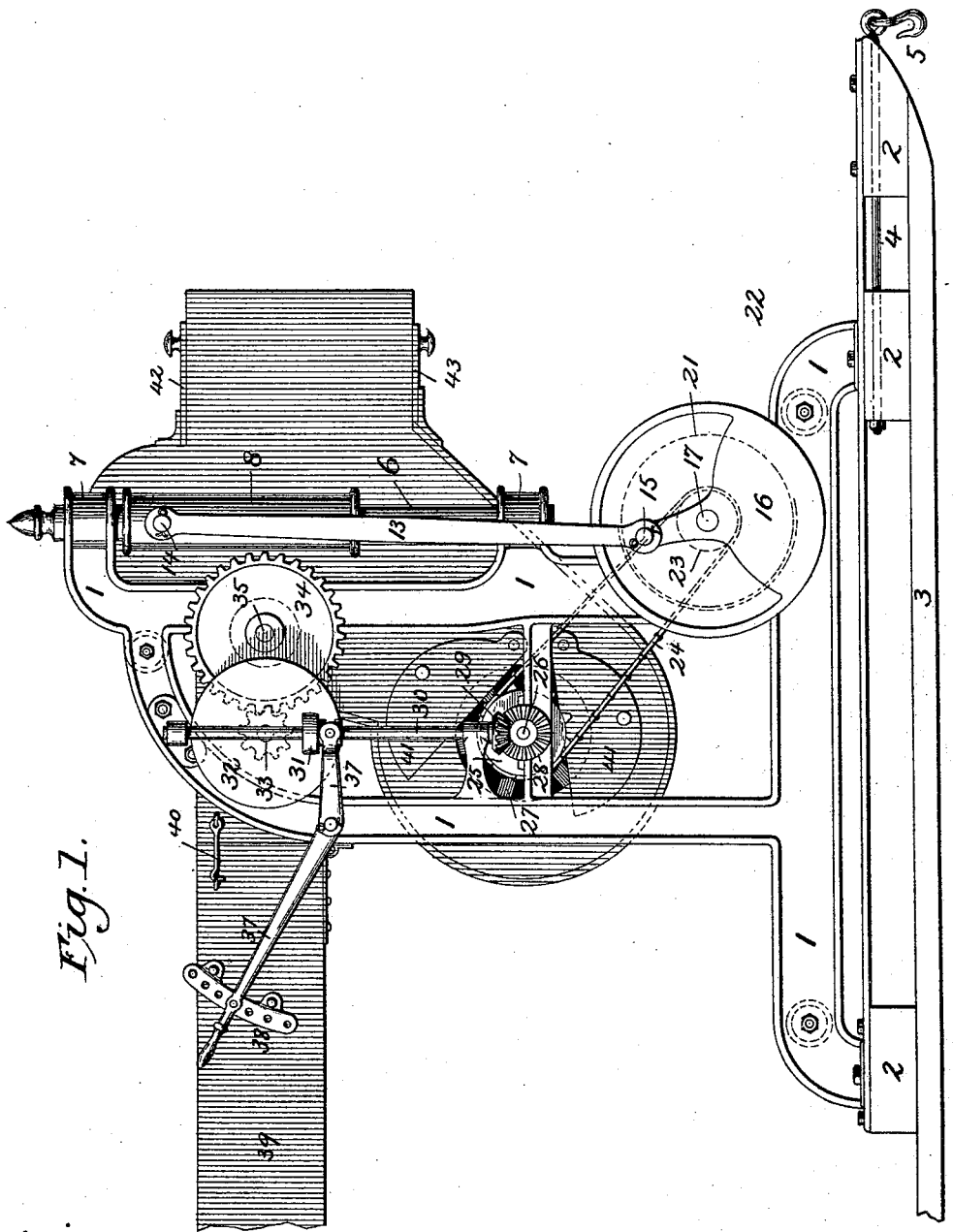
Figure 2:
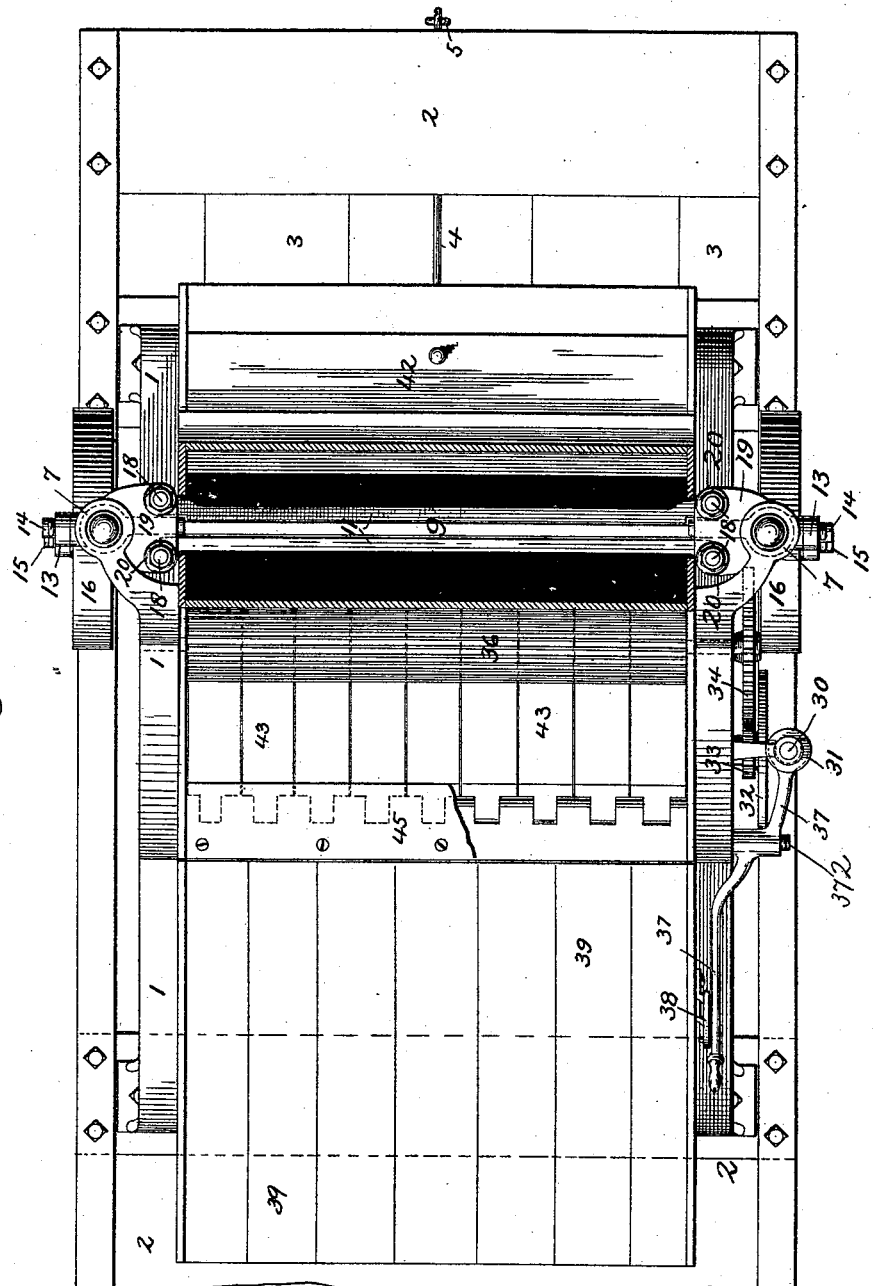
Figure 3:
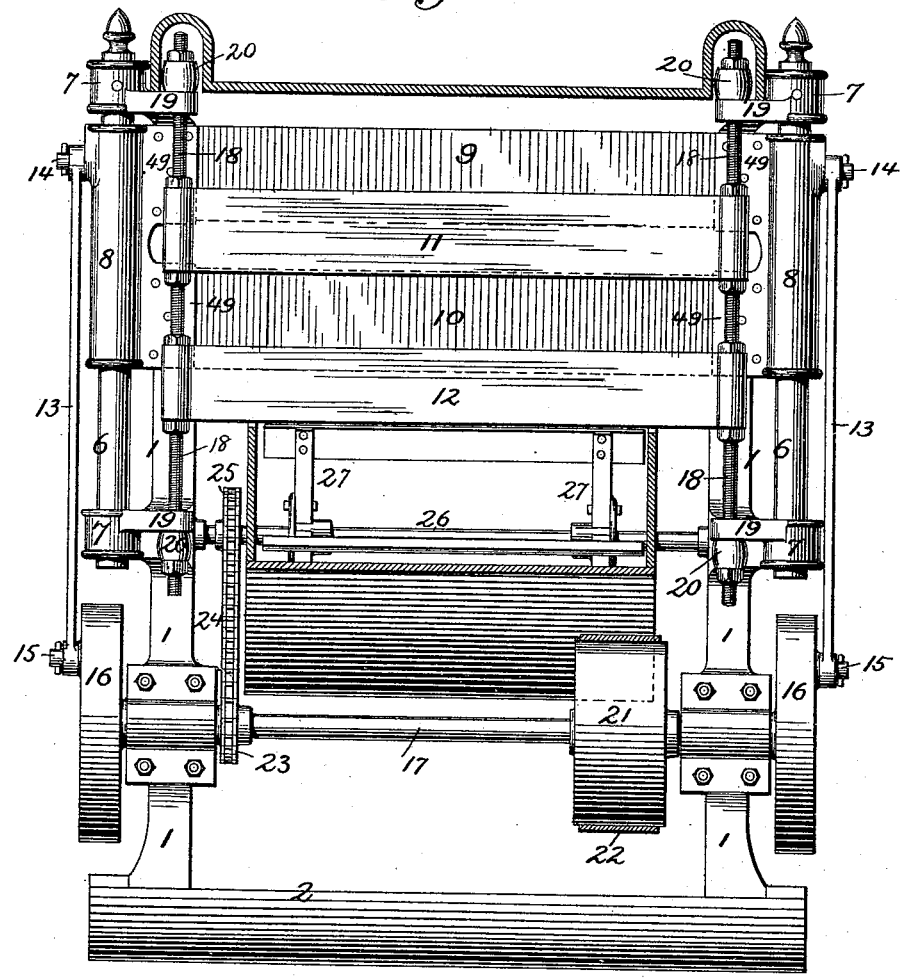
Figure 4:
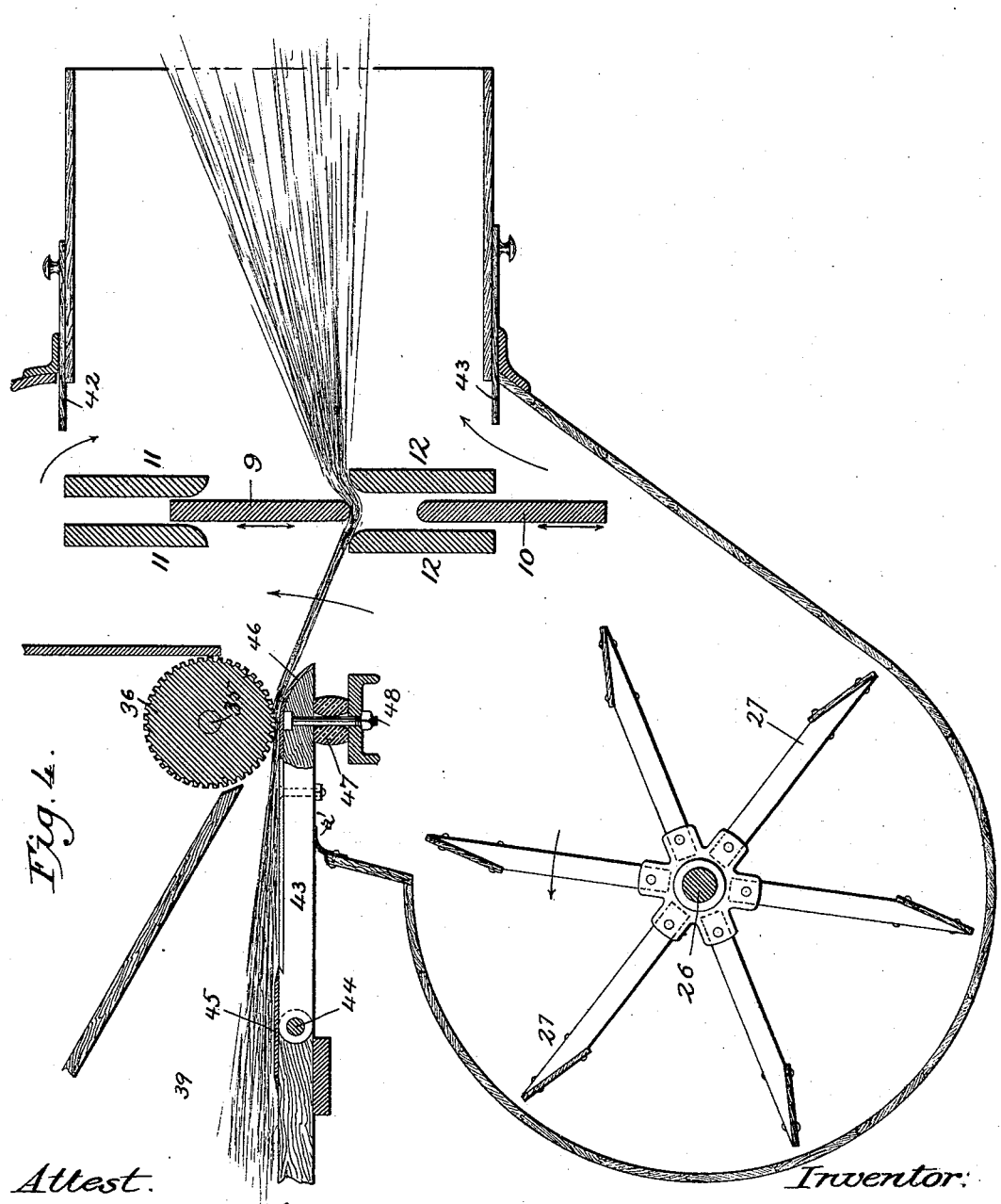
Figure 5:
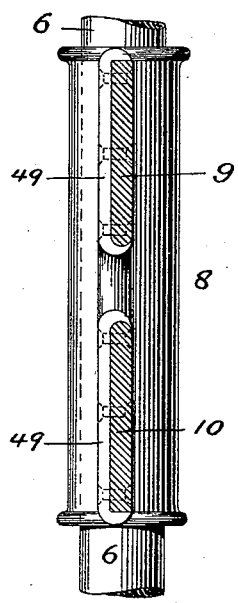
Figure 6:
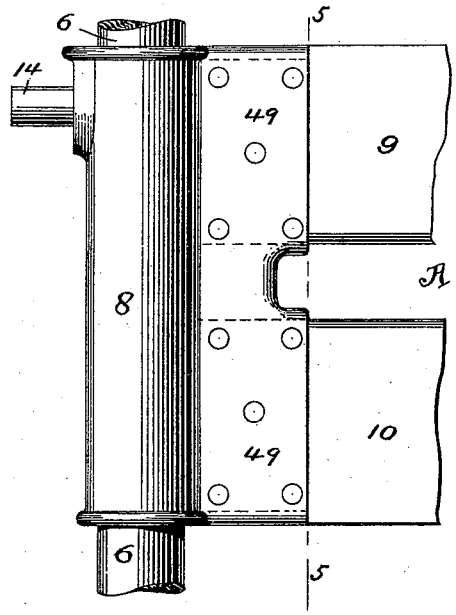
Figure 7:
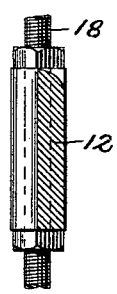
Figure 8:
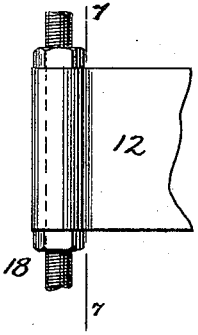
Figure 9:
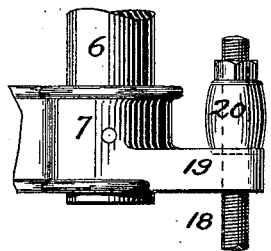
Figure 10:
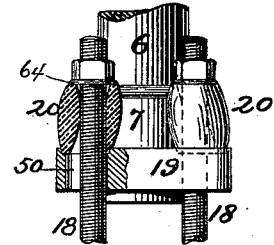
Figure 11:
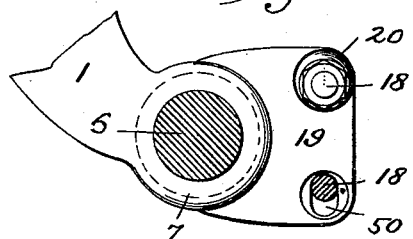

In the drawings, Figure 1 is a side elevation of my improved machine for treating fibrous stalks. Fig. 2 is a top plan view of the same with a portion of the casing broken away to show the break-bars. Fig. 3 is an elevation of the delivery end of my machine with part of the casing removed, showing the break-bars and fan location. Fig. 4 is an enlarged view in longitudinal section through the center of my machine, showing the essential features of the invention, as stated hereinafter. Figs. 5 and 6 are detail views showing on a large scale the construction of the reciprocating sash. Figs. 7 and 8 are similar views showing the break-bars. Figs. 9, 10, and 11 are enlarged detail views of the yielding or spring support of same, as described.

In the drawings, 1 is the main supporting-frame, preferably made of cast-iron, one frame on each side of the machine, which I have also shown as being securely bolted to the cross-sills 2 of the transporting-runners 3 and 4, to which is attached a draw-bolt 5.

In the drawings illustrating my devices the material to be treated or acted on by the machine is placed in a supporting or yielding chute or box 39, which has a removable side piece secured by hook 40, and the material passes under a corrugated feed-roller 36, and as it is forced outward beneath the roller the aperture is provided with means of expansion and contraction at any point beneath the roller or the entire width of the aperture upon which the material is supported in its outward passage, as the passage-way is provided at this point with a series of yielding fingers or bars 43, having steel-plated surfaces 46, which fingers are pivoted at 44 to the stationary portion of the table beneath a shield 45. The elasticity of the same I have provided for by placing immediately under the feed-roller 36 separate rubber springs 47, secured by bolts 48, that support separately each bar or finger. This permits a yielding pressure, and the variable or uneven quantities of the outward-moving stream is not liable to obstruct the regularity of flow or separate the stream and interrupt the flow through the stalk-breaking devices and cause repeated breaking or mutilation of the fiber. The condition or tensile strength of the fiber is changeable, and it differs in various periods after its harvest, and is very materially affected by the atmospherical conditions at the time of decortication.

My breaking device consists of a vertically-reciprocating frame 8 or sash, that is mounted at each side on vertical bearings 6, secured to supports 7 on the main frame. This reciprocating frame consists of an upper and lower bar 9 and 10, loosely secured at each end in an enlarged aperture 49 in the vertically-reciprocating frame. This manner of securing the reciprocating bars provides a means for imparting a flexible stroke of the bars against the hemp, which is not liable to break the fiber, as is the case when the blow or contact is made by or between rigid bars or surfaces, which have no facility of yielding. The stationary bars are provided with means to admit this yielding movement for the same purpose.

The crank-journal 14 on the side of the frame 8 has attached thereon, at each side, a pitman 13, secured to a crank pin or journal 15 in the disk 16, that is secured to the power-shaft 17, through which it derives its motion by means of the driving-pulley 21 and its actuating-belt 22. The bars 9 and 10 of the reciprocating frame are placed at a sufficient distance apart to provide a throat or passage-way A, through which the stalks are forced, while above and below the bars 9 and 10, on each side and parallel therewith, are placed elastically-secured stationary break-bars 11 11 12 12, and the aperture or throat or passage-way for the stalks being larger and of greater distance apart than in the reciprocating bars, these break-bars 11 11 12 12 are supported and adjustably secured at each end to vertical rods 18 18 18 18, which supporting-rods are elastically and adjustably supported on the slotted projecting lugs 19 19 on the main frame by means of elastic cushions 20 20 20 20, located above and below on the slotted projecting lugs and in the slotted apertures 50, through which the rods 18 pass, as shown in Figs. 9, 10, and 11, and at each end the adjusting-nut rests on a metallic friction-washer.

The object of making a wider space between the stationary break-bars, through which the stream of stalks pass, than in the reciprocating sash is to admit of free space for expansion of the material as it is forced from the supporting-bars against and between which it is broken above and below by the action of the reciprocating sash. This space also materially aids in separating the fiber from the wood, and also facilitates the outward passage of the stream of broken stalks and the disentanglement of the fiber.

The elongated aperture or slot 50 in the supporting-lugs 19 admit of a lateral movement of the bar-supporting rods 18 18 in order that the bars 11 11 and 12 12 may be able to yield at times when a large quantity of stalks of material being acted on by the reciprocating bars 9 10 is forced between them, and thus prevent the mutilation or breaking of the fiber or clogging of the machine under a large stream of stalks.

It will be observed that all of my break-bars are provided with rounded edges in order that the fiber of the stalk may not be cut thereby. I have also provided means for producing an outwardly forcing or driving air current or pressure in the direction of the movement of the hemp to assist in forcing forward the stalks as they are acted on by the breaker, and at the same time the current of air is directed to straighten the lint and force it outwardly and to disentagle its fibers, and also assist in separating the hurd of stalks from the lint or fiber. This current of air is created by fan-arms 27, of any desired number, mounted on a rapidly-revolving shaft 26. The fan-case, which has opening ends 41, is provided with an elastic apron attachment $a'$ under the yielding fingers 43, so as not to interfere with the yielding action of said fingers. I have also provided means for varying and changing the direction of the current of air and regulating the same to cause the current to pass upward between the feed-roller and break-bars and thence to continue over or between the break-bars, so that it may be brought downwardly upon the fiber that has passed through the breaker by changing its direction to force the current of air beneath the breaking device and thence upwardly from below against the fiber on its under side, and at the same time the current of air will pass outwardly through the throat or passage-way as it is opened by the reciprocating movements of the passage-way A or throat of the vertically-moving break-bars 9 10. I have provided sliding or regulating movable plates 42 431 for controlling and regulating the direction of the air, as desired, in the operation of the machine on different conditions of the fiber and stocks, and by means of my adaptation and changing the manner of application of the air-currents it will be found of great value and utility in practical use. I have also provided my feed-roller with an adjustable speed-regulating device, as it is very desirable to increase or decrease the speed of the feed-supplying devices, so that it may be regulated to the varying conditions of the material under treatment; also, to enable the attendant to regulate the action of the feed as in his judgment it may be desirable to secure the best results. This device consists of the vertical shaft 30, provided with a bevel-pinion 29, through which it derives its motion from wheel 28 by means of a sprocket-wheel 25, secured to shaft 26, that is actuated by driving-chain 24, and its sprocket-wheel 23, that is secured to the main shaft 17, and this vertical shaft 30 is provided with a vertically-adjustable friction-roller 31, that revolves with the shaft, and being in frictional contact with disk 32, secured to shaft 33, that is provided with a driving-pinion 342, that actuates the gear driving-wheel 34, secured to shaft 35 of the feed-roller. This driving-disk or friction-roller 31 imparts motion to the feeding-roller, and the hand-lever 37, pivoted at 372, is secured to a collar that encircles the driving-roller, and as the lever is adjusted up or down and locked to plate 38 it moves the friction-roller to any desirable point between the periphery and the center of the disk 32 and thus imparts increased or decreased motion to the driving pinion or shaft 33.

Having thus described my invention, I claim—

1. The combination of the feed-box 39, its elastic yielding fingers 43, and the feed-roller 36 with the vertically-reciprocating break-bars 9 and 10, provided with rounded or beveled breaking-edges, the stationary break-bars 11 11 and 12 12, likewise provided with rounded or beveled edges, and means for adjusting the break-bars 11 11 and 12 12, substantially as described.

2. The combination of the movable break-bars 9 and 10, stationary break-bars 11 and 12, means for adjusting said stationary bars, and elastic and yielding supports for said stationary break-bars, substantially as described.

3. The combination of the reciprocating breaking sash or bars 9 and 10, provided with rounded edges, and the reciprocating frame to which said bars are loosely attached with the stationary break-bars 11 and 12 for supporting the stalks above and below and on each side of the reciprocating bars, and elastic and yielding supports for said stationary bars.

4. The combination of the reciprocating breaking-sash provided with a passage-way between the bars thereof, and the stationary elastically-supported bars 11 11 and 12 12, against which the stalks are broken, the passage-way between the stationary bars being deeper and larger vertically than the passageway between the reciprocating sash-bars to admit the expansion of the stalks and fiber as the outward-moving stream is reciprocated vertically across the passage-way and brought alternately in contact with and pressed partially between the stationary bars, substantially as shown, and for the purposes described.

5. The combination of the feed-roller 36, the elastic supporting-fingers 43, the breaking device, and the air-fan provided with means for directing the current of air upwardly beneath the breaking device or downwardly over the same and against the outgoing stream of stalks or lint, whereby the lint is forced outwardly and disentangled and cleaned in the manner shown and described.

6. The combination of the breaking-frame having a regular reciprocating movement for breaking the stalks, a feeding-roller, and adjustable devices for changing the speed of said feeding-roller, and a locking-detent to secure the said speed-changing devices in any of the adjustments, substantially as described.

7. The combination of the elastically-supported breaking-bars 11 11 and 12 12, their supporting-rods 18 18 18 18, and means whereby the said breaking-bars may be adjustably secured to the said supporting-rods, substantially as described.

AUGUSTUS E. ELLINWOOD.

Witnesses:
F. H. WATERS,
WM. ISBELL.